US008712818B2

(12) United States Patent
Giles et al.

(10) Patent No.: US 8,712,818 B2
(45) Date of Patent: *Apr. 29, 2014

(54) MACHINE SHOP INCLUDING COMPUTER SYSTEM THAT INTERFACES WITH DIFFERENT LEGACY SERVERS

(75) Inventors: Gary W. Giles, Elbing, KS (US); Randall E. Patten, Rose Hill, KS (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,462

(22) Filed: Aug. 31, 2012

(65) Prior Publication Data

US 2012/0330454 A1    Dec. 27, 2012

Related U.S. Application Data

(60) Division of application No. 10/461,037, filed on Jun. 13, 2003, now Pat. No. 8,285,777, which is a continuation of application No. 09/981,949, filed on Oct. 17, 2001, now Pat. No. 7,552,203.

(51) Int. Cl.
*G06Q 10/00* (2012.01)
*G06Q 10/06* (2012.01)
*G06Q 10/10* (2012.01)

(52) U.S. Cl.
CPC .... *G06Q 10/063112* (2013.01); *G06Q 10/0633* (2013.01); *G06Q 10/06* (2013.01); *G06Q 10/10* (2013.01)
USPC ........................................ 705/7.14; 705/7.27

(58) Field of Classification Search
CPC ... G06Q 10/0633; G06Q 10/06; G06Q 10/10; G06Q 10/063112
USPC .................. 707/104.1; 705/1.1, 4, 7.14, 7.27; 357/1.15, 1.18; 715/735, 853
See application file for complete search history.

(56) References Cited

U.S. PATENT DOCUMENTS

| 3,701,110 | A | * | 10/1972 | Tsugami ........................ 700/174 |
| 5,033,014 | A | * | 7/1991 | Carver et al. ...................... 703/1 |
| 5,146,404 | A | * | 9/1992 | Calloway et al. .............. 705/1.1 |
| 5,148,591 | A | * | 9/1992 | Pryor .......................... 29/407.04 |
| 5,231,585 | A | * | 7/1993 | Kobayashi et al. ............. 700/96 |
| 5,301,587 | A | * | 4/1994 | Blaimschein ................... 83/870 |
| 5,446,890 | A | * | 8/1995 | Renslo et al. ....................... 1/1 |
| 5,594,639 | A | * | 1/1997 | Atsumi ......................... 700/107 |
| 5,671,361 | A | * | 9/1997 | Brown et al. ................. 705/7.23 |
| 5,821,937 | A | * | 10/1998 | Tonelli et al. ................. 715/853 |
| 5,831,610 | A | * | 11/1998 | Tonelli et al. ................. 715/735 |
| 5,933,353 | A | * | 8/1999 | Abriam et al. ................ 700/182 |
| 6,064,429 | A | * | 5/2000 | Belk et al. ..................... 348/128 |
| 6,229,540 | B1 | * | 5/2001 | Tonelli et al. ................. 715/735 |
| 6,247,128 | B1 | * | 6/2001 | Fisher et al. .................. 713/100 |
| 6,330,005 | B1 | * | 12/2001 | Tonelli et al. ................. 715/735 |
| 6,415,191 | B1 | * | 7/2002 | Pryor .............................. 700/95 |
| 6,430,796 | B1 | * | 8/2002 | Jones et al. ................. 29/243.53 |
| 6,442,460 | B1 | * | 8/2002 | Larson et al. ................ 701/32.6 |

(Continued)

*Primary Examiner* — Hieu Hoang

(57) ABSTRACT

A machine shop comprises a computer system programmed to automatically determine an access role for a worker in response to a log-in; automatically determine at least one task for the worker based on the access role; and automatically interface with different legacy servers to order, subject to the access role, at least one of machine tooling for the machining of the part, product materials to be machined, and distributed numerical control (DNC) data for the machining of the part.

20 Claims, 12 Drawing Sheets

(56) References Cited

U.S. PATENT DOCUMENTS

| | | | |
|---|---|---|---|
| 6,463,352 B1 * | 10/2002 | Tadokoro et al. | 700/169 |
| 6,633,787 B1 * | 10/2003 | Sekitani | 700/96 |
| 6,738,747 B1 * | 5/2004 | Tanaka et al. | 705/7.22 |
| 6,847,853 B1 * | 1/2005 | Vinciarelli et al. | 700/97 |
| 6,850,252 B1 * | 2/2005 | Hoffberg | 715/716 |
| 6,959,235 B1 * | 10/2005 | Abdel-Malek et al. | 701/29.4 |
| 7,013,284 B2 * | 3/2006 | Guyan et al. | 705/4 |
| 7,187,663 B2 * | 3/2007 | Schmidt | 370/313 |
| 7,249,322 B2 * | 7/2007 | Jones et al. | 715/751 |
| 7,617,240 B2 * | 11/2009 | Guyan et al. | 705/1.1 |
| 7,979,382 B2 * | 7/2011 | Guyan et al. | 1/1 |
| 2001/0047276 A1 * | 11/2001 | Eisenhart | 705/1 |
| 2002/0038262 A1 * | 3/2002 | Fukuda et al. | 705/27 |
| 2002/0046214 A1 * | 4/2002 | Sandifer | 707/104.1 |
| 2002/0069210 A1 * | 6/2002 | Navani et al. | 707/104.1 |
| 2002/0103725 A1 * | 8/2002 | Martin et al. | 705/28 |
| 2002/0107677 A1 * | 8/2002 | Nguyen et al. | 703/13 |
| 2002/0123864 A1 * | 9/2002 | Eryurek et al. | 702/188 |
| 2002/0138568 A1 * | 9/2002 | Johansson | 709/203 |
| 2002/0144137 A1 * | 10/2002 | Harrah et al. | 713/200 |
| 2002/0174050 A1 * | 11/2002 | Eynard et al. | 705/37 |
| 2003/0004908 A1 * | 1/2003 | Linthicum et al. | 706/45 |
| 2003/0014426 A1 * | 1/2003 | Gimbert et al. | 707/104.1 |
| 2003/0036937 A1 * | 2/2003 | Shahidehpour | 705/8 |
| 2005/0005272 A1 * | 1/2005 | Moody et al. | 718/104 |

* cited by examiner

MACHINE SHOP INCLUDING COMPUTER SYSTEM THAT INTERFACES WITH DIFFERENT LEGACY SERVERS

This is a divisional of U.S. Ser. No. 10/461,037 filed Jun. 13, 2003, now U.S. Pat. No. 8,285,777. U.S. Ser. No. 10/461,037 is a continuation of U.S. Ser. No. 09/981,949 filed 17 Oct. 2001, now U.S. Pat. No. 7,552,203.

BACKGROUND

In studies conducted by the applicant, up to 45% of a worker's time spent in production in a commercial aircraft factory is attributable to logging into and out of various domains that control tools, design specifications, manpower tasking, and planning data. For instance, a lead machinist might spend 33 minutes per day per task receiving job assignments for the day, and each order may take as much as 13 minutes to check the appropriate tools out of the tool crib and the necessary part data for assembly. The actual fabrication of a part may take as little as 12 minutes per order, but then logging off may take an additional 8 minutes per order. In short, a large part of a worker's day is given over to the task of logging into and out of various systems necessary to control data or tools. On average, in one person's workday, 55% is spent in activities that add value to the manufactured product, the other 45% is given to administrative overhead of logging into and out of various systems to schedule work, track work, gather data necessary to do work, closing the work, and notifying a system of the completion of that work.

It is desirable to reduce the administrative overhead.

SUMMARY

According to an embodiment herein, a machine shop comprises a computer system programmed to automatically determine an access role for a worker in response to a log-in; automatically determine at least one task for the worker based on the access role; and automatically interface with different legacy servers to order, subject to the access role, at least one of machine tooling for the machining of the part, product materials to be machined, and distributed numerical control (DNC) data for the machining of the part.

According to another embodiment herein, a factory comprises a plurality of legacy servers, and a Gateway for automatically determining an access role for a worker in response to a log-in, automatically determining at least one task for the worker based on the access role; and automatically interfacing with the different legacy servers to order, subject to the access role, at least one of machine tooling for the machining of the part, product material to be machined, and distributed numerical control (DNC) data for the machining of the part.

These features and functions may be achieved independently in various embodiments or may be combined in other embodiments. Further details of the embodiments can be seen with reference to the following description and drawings.

DETAILED DESCRIPTION

Figure 1:
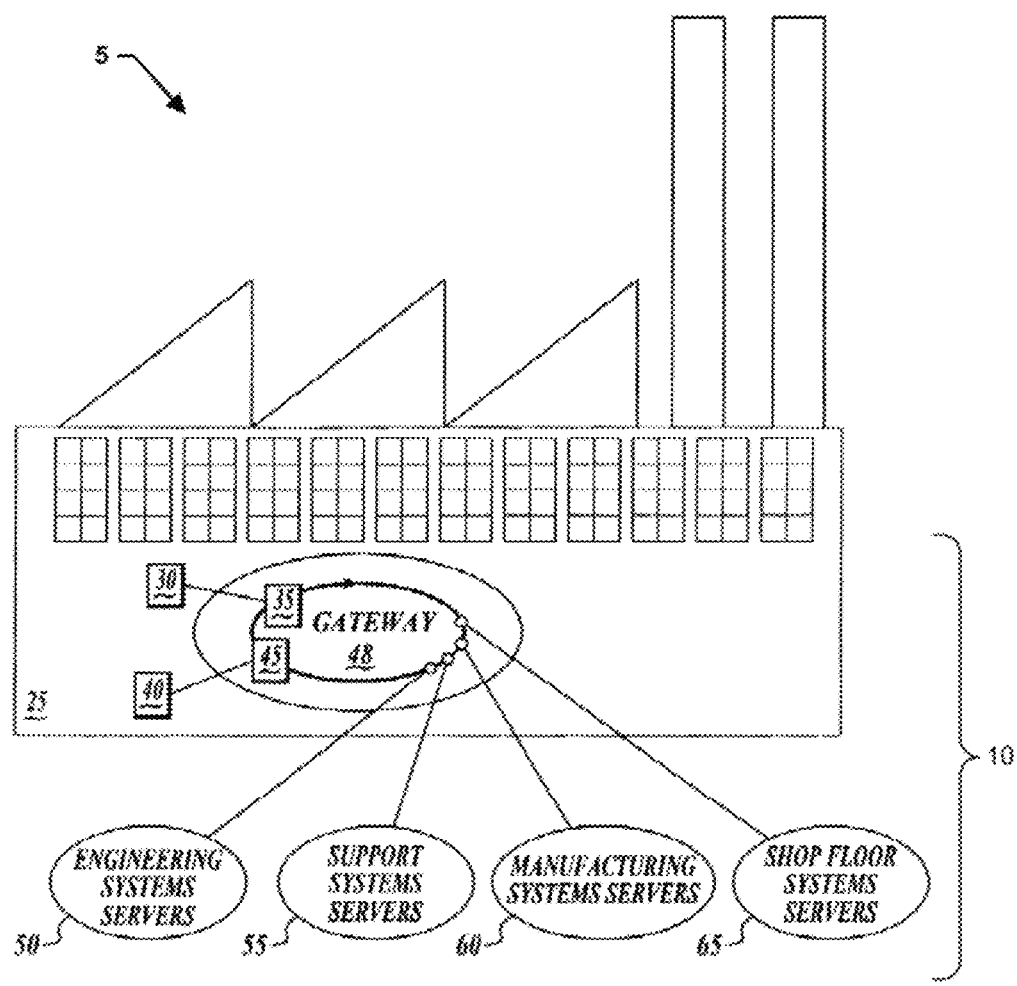
FIG. 1 is an illustration of a factory machine shop including a Gateway and a plurality of legacy servers.

FIG. 1 illustrates a factory machine shop 5 including a system 10 that, in turn, includes a computer system referred to as a "Gateway" 48 and several legacy servers 50, 55, 60 and 65 for engineering, support, manufacturing, and shop floor systems. Each of these existing or "legacy" servers 50-65 are built for the task at hand and generally will not include a single standard for sharing data and transmitting information to other legacy servers within the machine shop 5. The Gateway 48 includes a plurality of servers 35 and 45, as well as a plurality of clients 30 and 40 that run web browsers. The system 10 may include any number, more or less than represented in FIG. 1.

The Gateway 48 ties all of the legacy servers 50-65 together. To tie such legacy servers 50-65 together, in general, see articles such as those funded by DARPA Contract F30602-96-C0333, such as: Hardening COTS Software with Generic Software Wrappers, Timothy Fraser, Lee Badger, and Mark Feldman, published in the Proceedings of the 1999 IEEE Symposium on Security and Privacy; Detecting and Countering System Intrusions; Using Software Wrappers, Calvin Ko, Timothy Fraser, Lee Badger, and Douglas Kilpatrick, published in the Proceedings of the 9th USENIX Security Symposium, Denver, Colo., Aug. 14-17, 2000; Building Blocks for Achieving Quality of Service with Commercial Off-the-Shelf (COTS) Middleware, Andreas Polze, May 1999, TECHNICAL REPORT, CMU/SEI-99-TR-001, ESC-TR-99-001; Into the Black Box: A Case Study in Obtaining Visibility into Commercial Software, Daniel Plakosh, Scott Hissam, and Kurt Wallnau, March 1999, COTS-Based Systems Initiative, Technical Note, CMU/SEI-99-TN-010; Custom vs. Off-The-Shelf Architecture, Robert C. Seacord, Kurt Wallnau, John Robert, Santiago Comella-Dorda, and Scott A. Hissam, May 1999, COTS-Based Systems Initiative, Technical Note CMU/SEI-99-TN-006; TECHNICAL REPORT CMU/SEI-2000-TR-010 ESC-TR-2000-010; An Activity Framework for COTS-Based Systems, Tricia Oberndorf, Lisa Brownsword, and Carol A. Sledge, PhD, October 2000.

Figure 2:
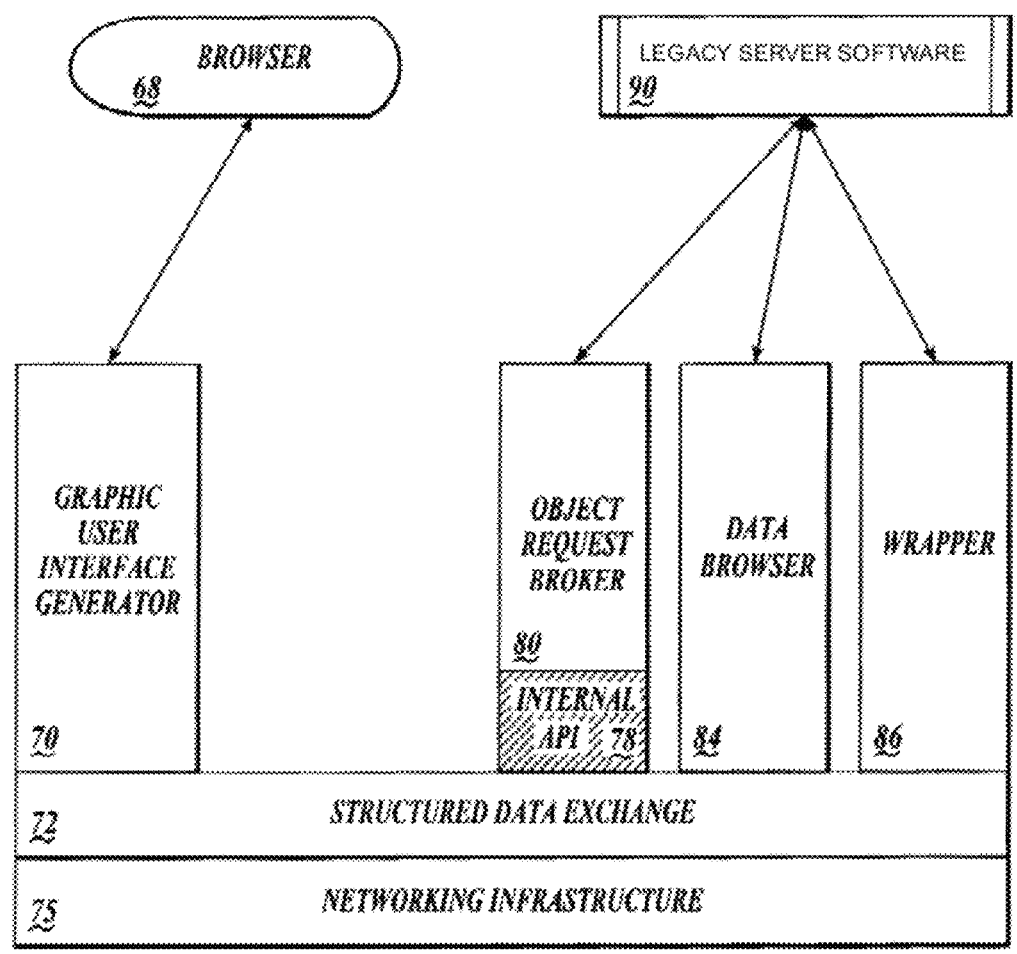
FIG. 2 is an illustration of a software infrastructure for the Gateway.

FIG. 2 shows three of the several approaches by which the Gateway 48 ties legacy server software 90 (run by the legacy servers 50-65) into a workable software infrastructure. A user of the system 10 interfaces with the system 10 via a web browser 68. The web browser 68 communicates with a Graphic User Interface Generator 70. Extending from the Graphic User Interface Generator 70 to a Networking Infrastructure 75 is a Structured Data Exchange 72. The Structured Data Exchange 72 provides a mediating language between the legacy servers 50-65. If the Graphic User Interface Generator 70 provides a two-way communications portal between the system 10 and the user, a translation means between the uniform language of the Graphic User Interface Generator 70 will interpret the signals into requests for legacy server programs.

In some embodiments, the translation means may "objectify" the legacy server programs 90. If a user click on a screen evokes the projection of a parts catalog on the screen, the Graphic User Interface Generator 70 will generate a code in terms that will generally be uniform over the page. Once the code identifies a function, the Structured Data Exchange 72 develops a uniform means of packaging the request as a request for an object. Requests should be uniform across all platforms, and responses to those requests should be uniform across all platforms. If, for instance, there exists two definitions for a part (distinct as it appears in each of two legacy programs), that part should have a definition that reflects one or the other of the definitions, or, itself, is a third definition. A lookup table may be used for the translation of uniform part definition into the remaining definitions necessary so that the part in one program means the part in another program and means the part across the system. The Structured Data Exchange 72 will use that uniform language.

The several components, the browser 68, the Graphic User Interface Generator 70, and the Structured Data Exchange 72, have as their purpose the translation of user requests to computer-readable requests on the Networking Infrastructure 75. The remaining components have a rough symmetry in purpose, facilitating communication between legacy server software 90 and the Networking Infrastructure 75.

Common Object Request Broker Architecture (CORBA) may be used to "wrap" the legacy software. CORBA is an architecture and specification for creating, distributing, and managing distributed program objects in a network. It allows programs at different locations and developed by different vendors to communicate in a network through an "interface broker."

An Object Request Broker (ORB) 80 provides support in a network of clients and servers on different computers so a client program (which may itself be an object) can request services from a server program or object without having to understand where the server is in a distributed network or what the interface to the server program looks like. To make requests or return replies between the ORBs 80, programs use internal APIs 78.

Another means of connecting the legacy server software 90 to the Networking Infrastructure 75 is through wrappers 86. A wrapper 86 is a program or script that sets the stage and makes possible the running of another, more important program. Wrappers 86 can "objectify" legacy programs. By wrapping the access to the legacy server software 90, the legacy servers 50-65 operate within their own environment while the wrappers 86 may simulate the interactions that a logged in user would normally supply to the system 10. The wrapper 86 mediates the language of the legacy server software 90 and the Structured Data Exchange 72.

Still another means of connecting the legacy server software 90 to the Networking Infrastructure 75 is through a custom data browser 84. The custom data browser works around the legacy software 90.

The paradigm for the system 10 is to wrap the machine shop 5 around its users (e.g., machinists) as a complete interface. Wrapped within that paradigm is the idea of security. While optimizing delivery of information, the system 10 still only provides information on a "need to know" basis. To that end, a system administrator defines each user of the system 10. Roles define each user. The roles necessary to the construction of even complex machinery are well-known and are the subject of project engineering. Gantt charts and the attendant critical path study demonstrate the knowledge of the roles necessary to manufacture a product.

For each user logging on to the system 10, the system 10 may impart security levels for each of the legacy servers consistent with the user's role in production. Each role evokes a constellation of log-ins to the several servers unique to that role. With each of the legacy servers 50-65, there exists a level of access and that level of access might be variable across the servers 50-65.

Figure 3:
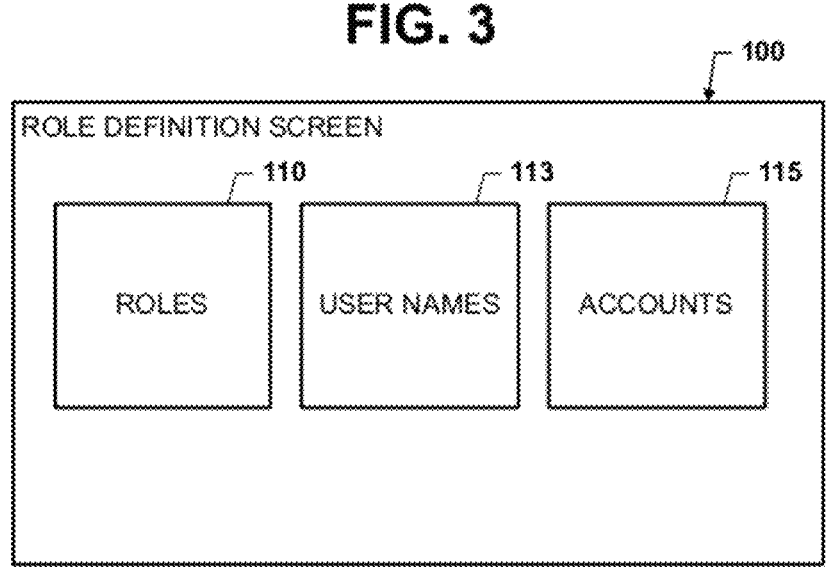
FIG. 3 is an illustration of a role definition screen.

FIG. 3 illustrates a role definition screen 100, which allows a system administrator access through the browser 68. On that screen 100, the system administrator defines an association between a user and the roles appropriate for that user. The roles may be displayed in the form of a matrix. A first column of the matrix may provide roles 110 such as NC Machine Shop Operators, Assembly Mechanics, and Quality Improvement Inspectors. A second column may provide user names 113, and a third column may provide user log-on accounts 115. For example, the matrix includes the following entry: operator 110, John Smith 113, with the log-on user account bjs2774 115. The association between these three identity elements role-name-user account, defines the constellation of security rights for John Smith. Beyond that, as Mr. Smith is an operator the system 10 now knows a great deal more about him.

When a user logs in on a job, the system 10 knows what assignments that user will receive. Beyond that, because of associations stored within the Gateway 48 between assignments or tasks and tools, the system 10 is aware of the necessary tools and materials. Still further, the system 10 can provide, at the browser 68, detailed pictorial instructions showing the best method stored therein for completing the task. The system 10 obviates the need to sign into the tool crib to check out tools, to request materials for the task, to requisition cutters, and to look up assembly instructions. All of this is possible because of the association between the user and his role.

Figure 4:
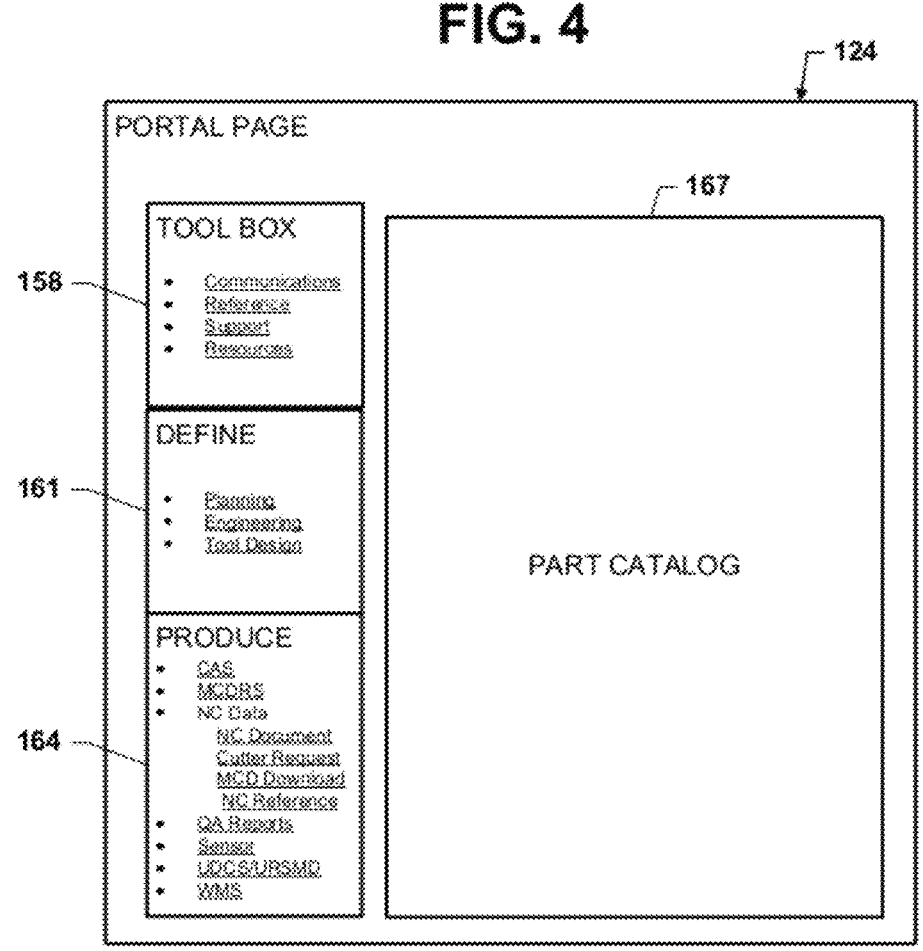
FIG. 4 is an illustration of a portal page displaying a part catalog.

FIG. 4 shows a portal page 124, which is displayed on the browser 68 after a user logs on. This portal page 124 is directed at the performance of the assigned tasks. By selecting links in a tool box section 158, the user can summon information necessary for the operations that the role comprises (e.g., links to references, support, and resources). Among the resources are explicit the data from a Define server 161, and all of the servers 164 that assist production. Each of the data sources necessary for production are available by simple selection from the menu presented there.

For instance, a part catalog 167 may be selected. A part catalog 167 server automatically serves part information for each task as the employee logs onto that task. For any single part, the catalog 167 may present the part number, a verbose description, a due date, an estimated completion date, book time for production, an operation code, and the assignment to the user, the status report, and for whom the part might be held. This information may normally exist in manuals or in stovepipe information systems at the assignment desk for reference. By lowering the threshold to this information, the system 10 assures the ease of checking. Lowering this threshold, in turn, assures better quality control.

Figure 5:
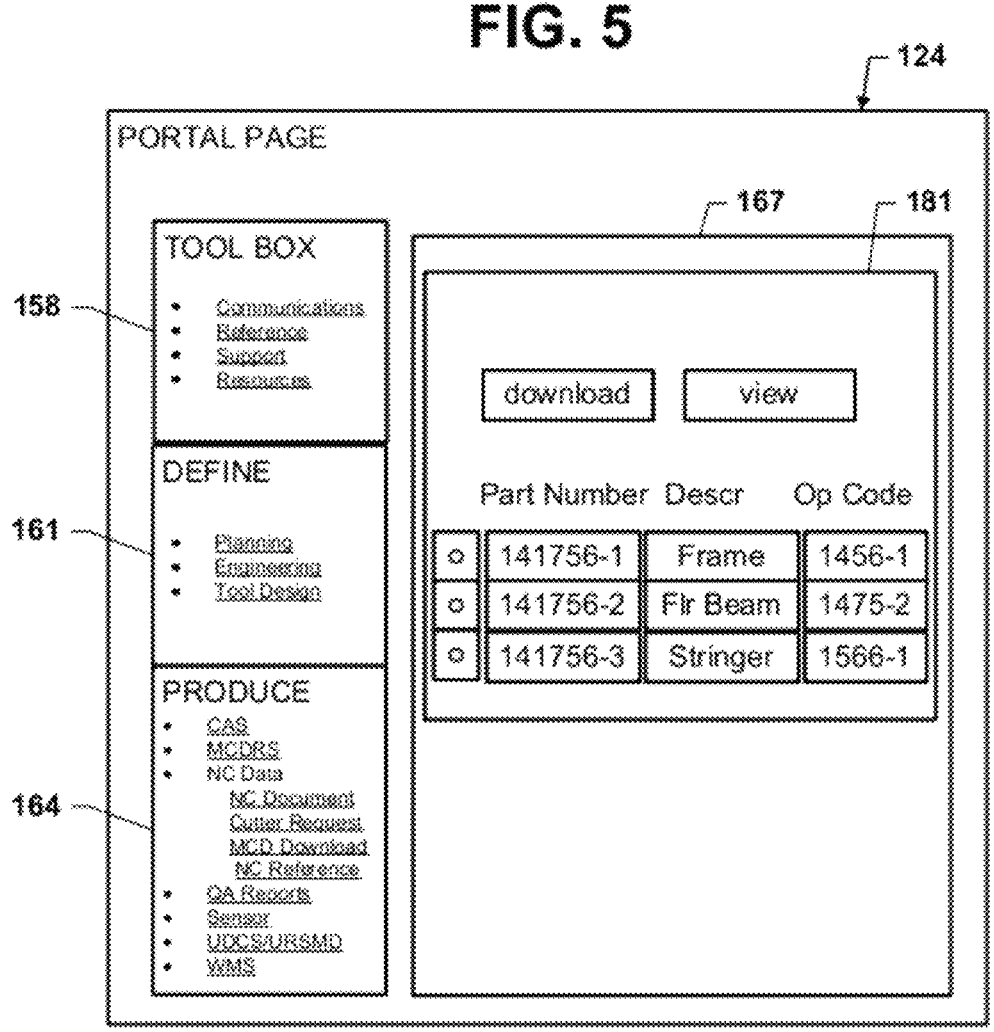
FIG. 5 is an illustration of the portal page displaying a list of parts.

FIG. 5 demonstrates how greatly the system 10 enhances the "standard" content in parts manuals. Shown at 181, the system 10 presents the user with the opportunity to download machine control data according to the specifications, the views, and other functions attendant to fabrication. Again, the system 10 determines the needs of the user and, in this instance, downloads the machine control data to control the Distributed Numerical Control (DNC). Indeed, the browser 68 may enable the direct control of the machinery in accord with the method taught and incorporated through reference to the application entitled, "System, Method And Computer-Program Product For Transferring A Numerical Control Program To Thereby Control A Machine Tool Controller" Ser. No. 09/864,496, now U.S. Pat. No. 6,834,214.

Figure 6:
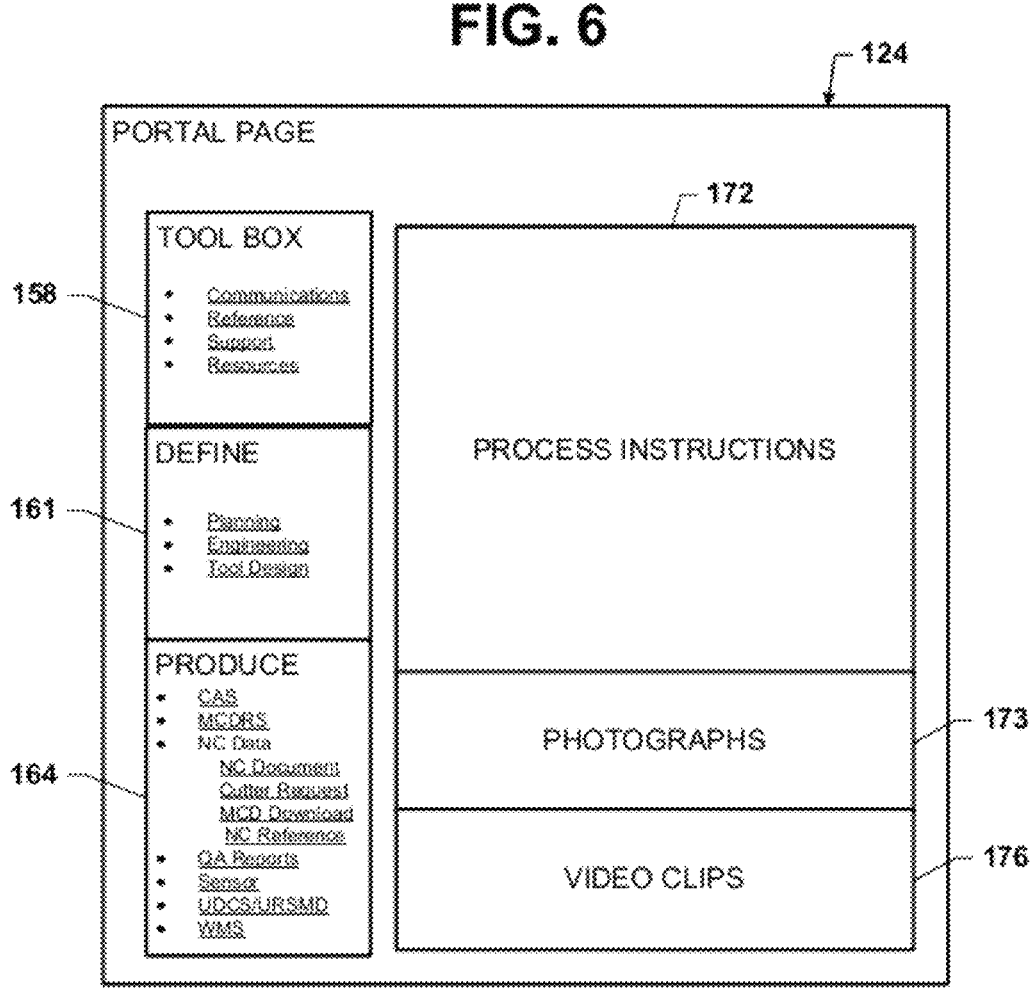
FIG. 6 is an illustration of the portal page displaying process instructions.

Not only can the system 10 inform the actions of machinists and machinery operators but also those assembling the various machined parts. As shown in FIG. 6, the portal page 124 may display process instructions 172 for the actual placement of the parts. The process instructions 172 may be supplemented with photographs 173 and video clips 176. A video clip 176 may show the part as it rotates in three-dimensional space.

Figure 7:
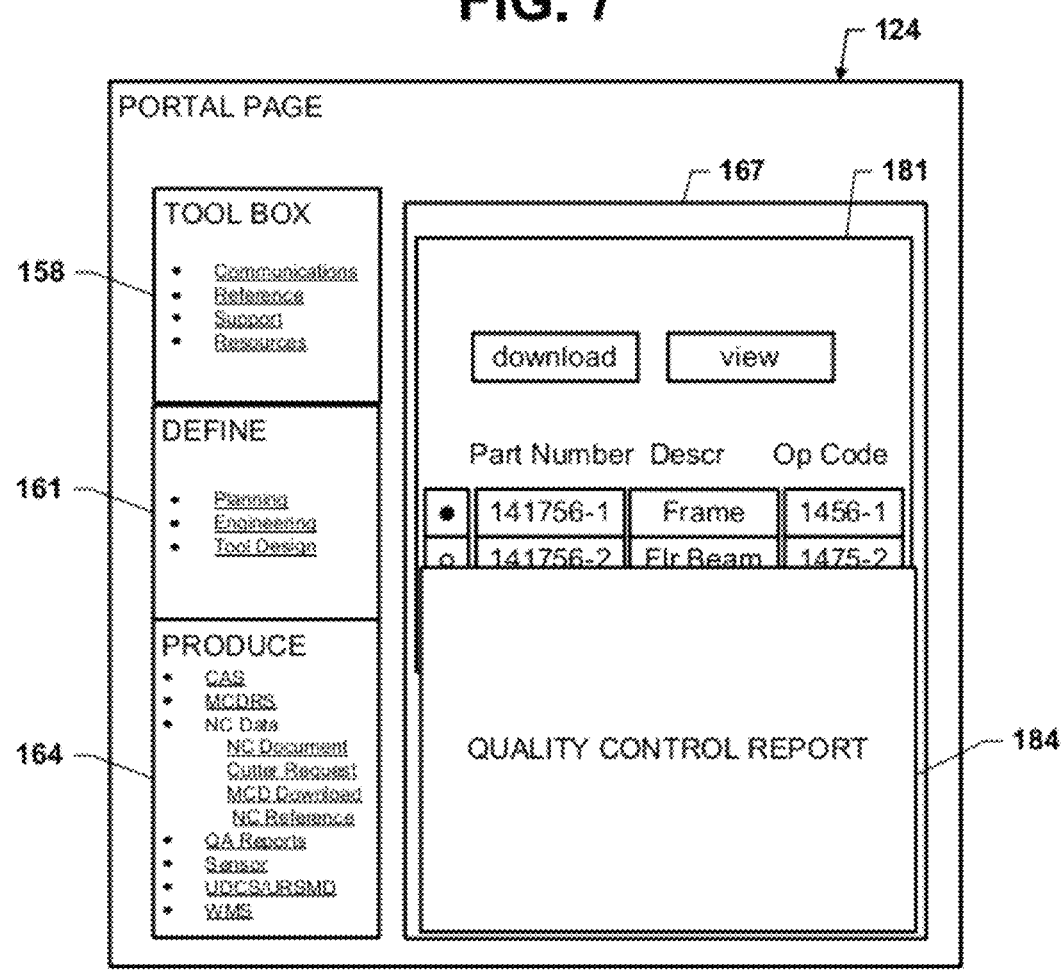
FIG. 7 is an illustration of the portal page displaying a quality control report.

Once an assembly has been machined, formed, or otherwise fabricated, the system 10 may provide the user with access to quality control data (which is generated when inspectors measure the assembly). In FIG. 7, the user selects a part, and a quality control report 184 is displayed on the portal page 124. Consider the hypothetical situation where a stepper motor consistently binds in one position, thereby offsetting slightly the locations of holes in the work piece. The system 10 enables the user to readily detect the variance from the intended locations and then make repairs or adjustments to remedy the condition of the machinery.

Figure 8:
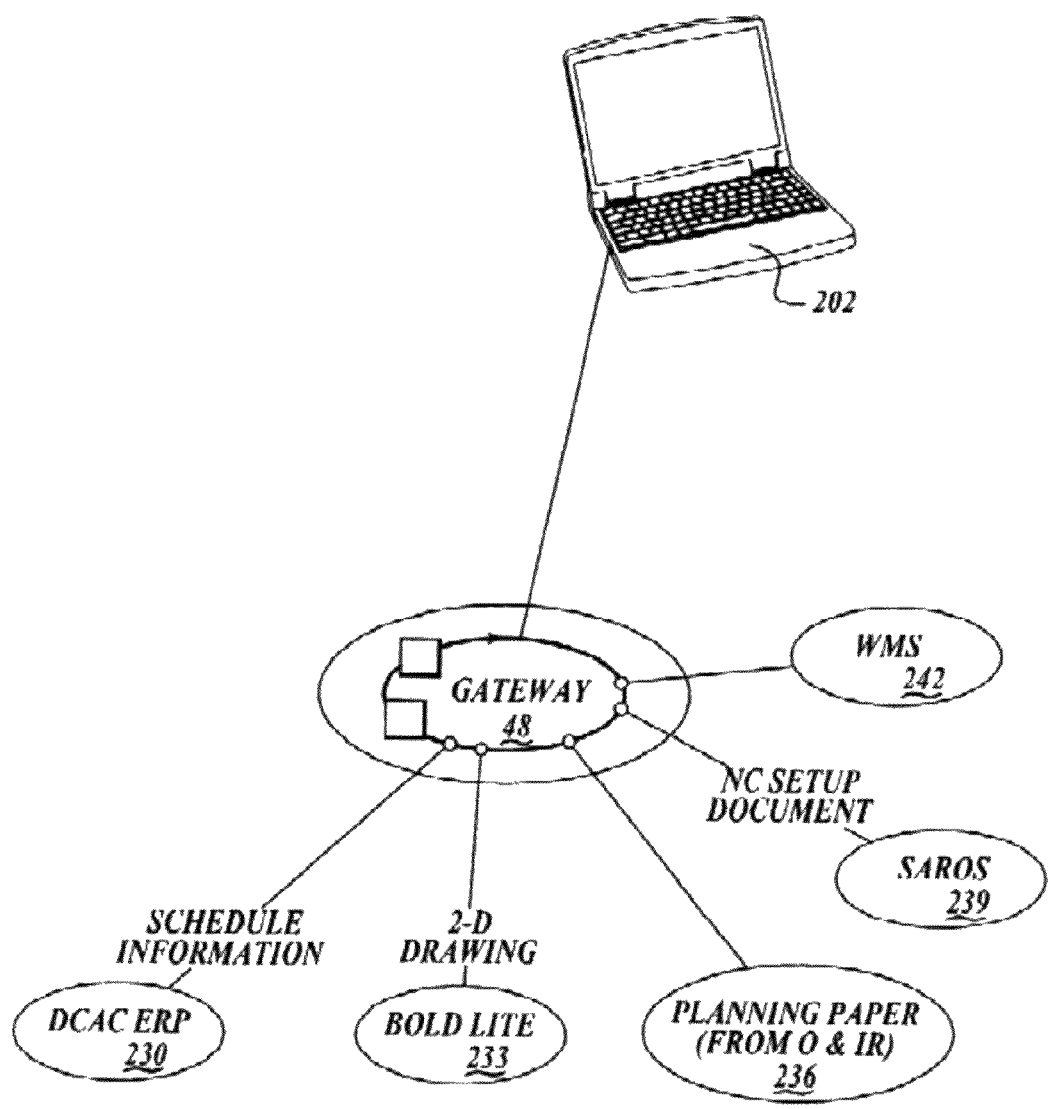
FIGS. 8-11 illustrate information available from the constellation of servers available to the various example roles in product integration to further the completion of their responsibilities within the factory.
Figure 9:
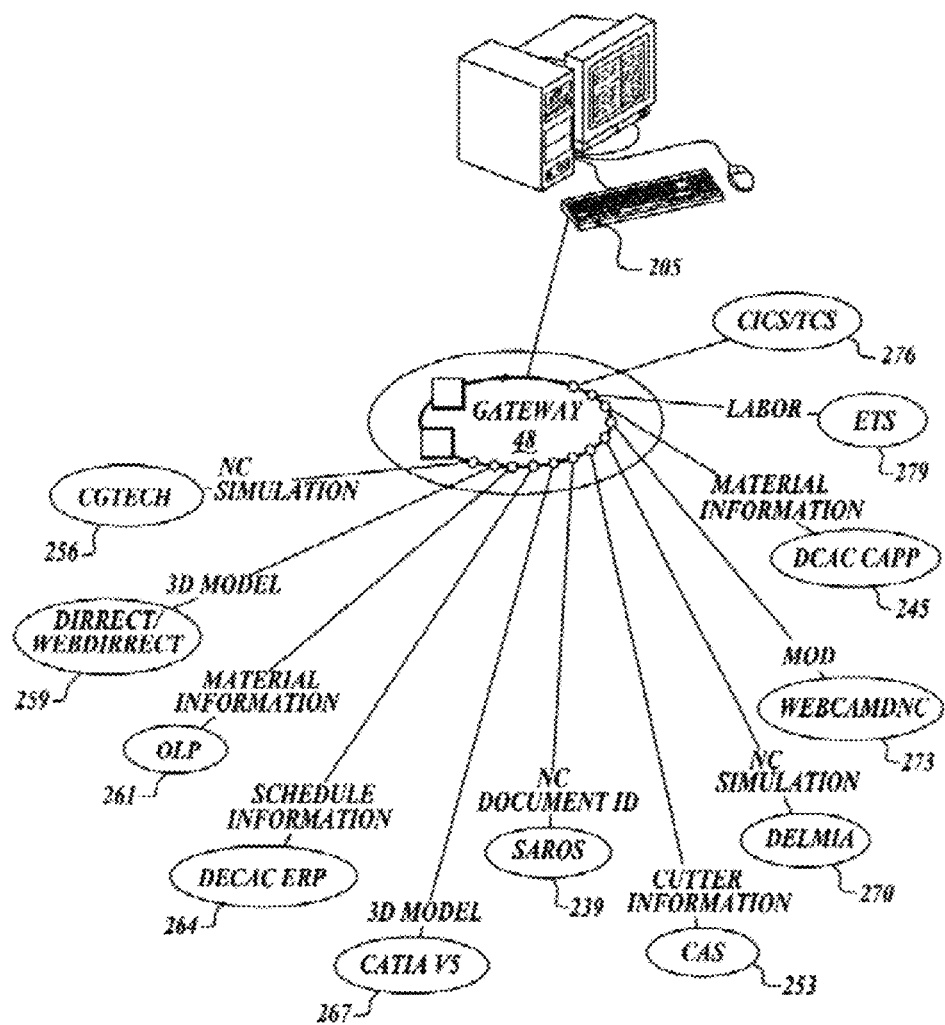

FIGS. 8-11 show the underlying topography that allows the presentation of information according to roles for a commercial aircraft factory. FIG. 8 portrays the access allowed to a resource planner. Using his laptop computer, a setup technician draws down information from a resource-management software-server, in this case, a Define and Control Airplane Configuration (DCAC) 230, which refers to software used to simplify and improve internal processes for handling airplane configuration data. Data that defines a customer's requested configuration for an airplane is made available to resource planners. For example, the type of seats, galleys, lavatories, carpet, avionics, and engines, and uses that data to turn a "basic" airplane into one that has the customer's particular configuration. From the BOLD Lite® server 233, a resource planner receives the two-dimensional drawings defining placement of specialized components within the airplane. Planning Papers designating the sequencing of assembly procedures come from the O & IR server 236. Other such servers exist for SAROS® data 239 and the work center management system (WMS) 242. Similarly, when the Numeric Control programmers sign onto their desktop computers 205 (see FIG. 9), they are given access to data found on dozens of servers: CGTech 256 for simulation data; DIRRECT/Web-DIRRECT 259 for 3-Dimensioned models; OLP 261 yields material data; DCAC 264 for scheduling information, etc.

Figure 10:
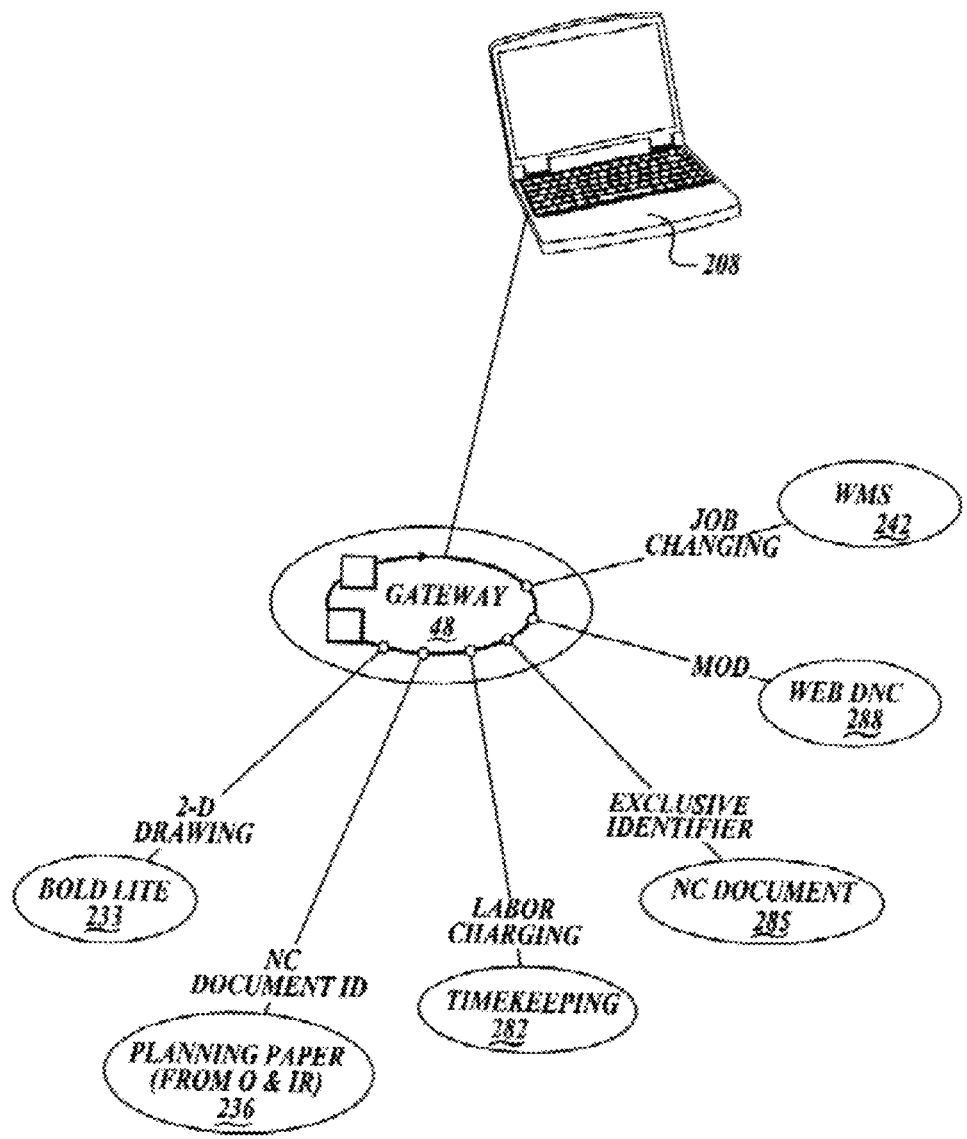

The utility theme continues for the NC Machine Operator, such as Mr. Smith. FIG. 10 portrays this topology again as deployed for Mr. Smith. Mr. Smith logs on through his laptop 208 onto the Gateway 48 to get the access unique to Mr. Smith's needs. The constellation of servers will allow Mr. Smith to log onto the job; to get materials from work center management 242; and, all of the data from the necessary servers 233, 236, 285 and 288.

Figure 11:
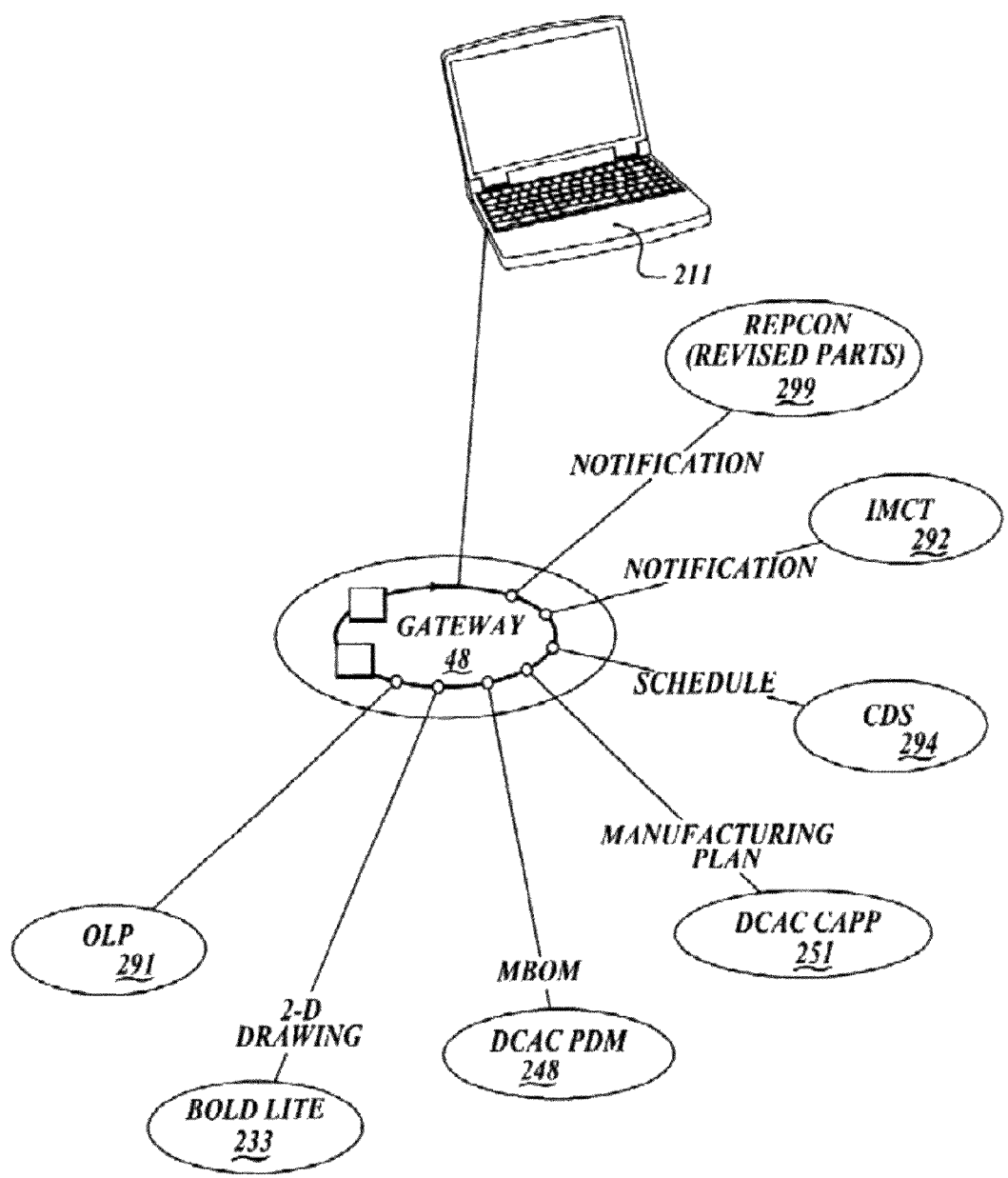

As a final example, though not intended to limit the range of the uses for the system 10, FIG. 11 presents servers available to Mr. Smith's lead machinist. This, too, is a unique constellation of servers available according to the known needs of the lead machinist.

The Gateway 48 can automate all of the necessary administrative support for system users. Inherent in the system 10 is not only the knowledge of who is using the system, but for what they wanted to use it. To aid them in that, the system 10 may log them onto and off the various servers necessary based upon the principal log-in. Extending that same principle, the system 10 can order tools without waiting for the specific order from the user. The system 10 optimizes the user's tasks to the user's skills, assuring the satisfaction and morale of the user.

Figure 12A:
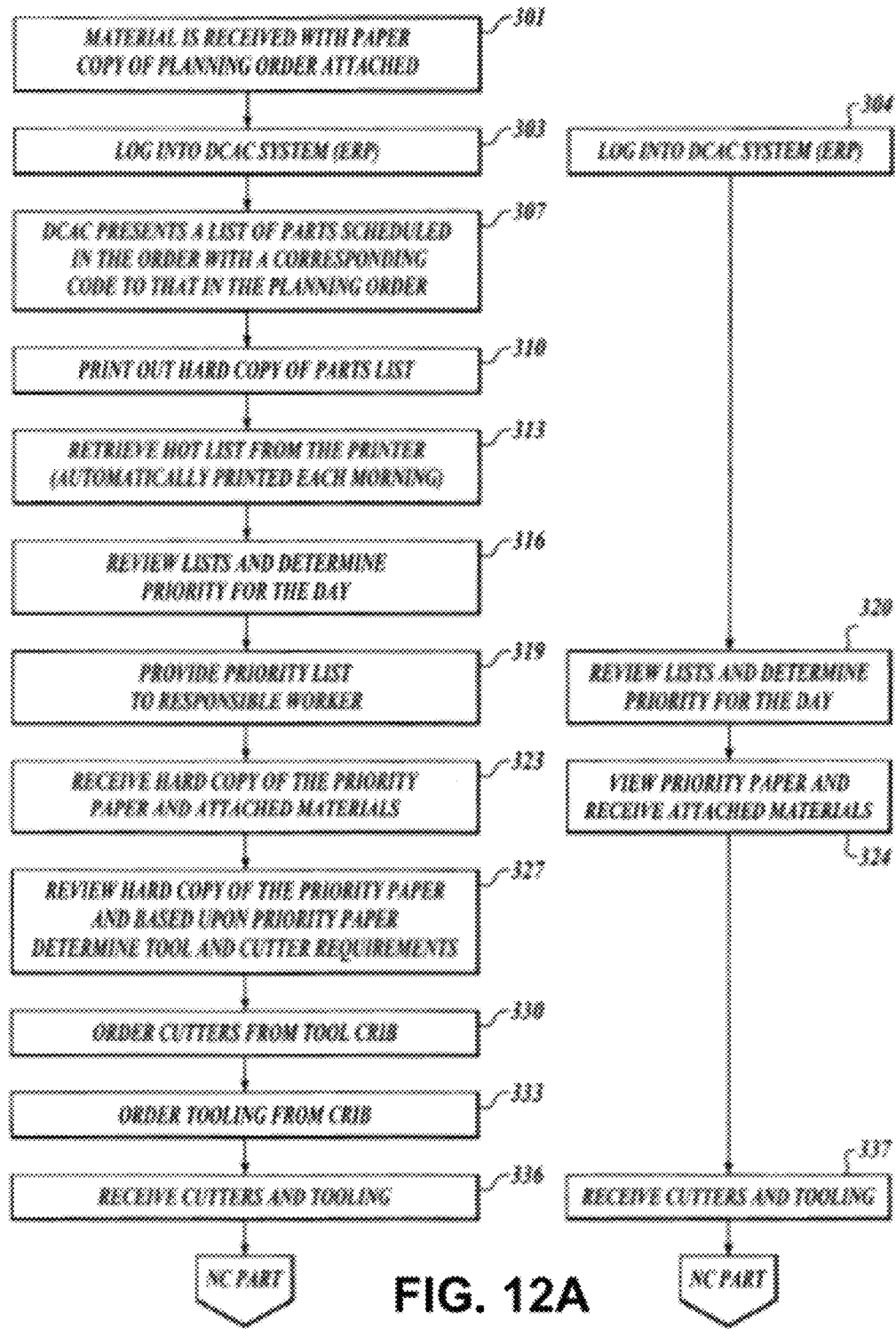
FIGS. 12A and 12B are illustrations comparing a prior art procedure employed by a machinist to a procedure described herein.

FIG. 12A shows how the system can streamline the tasking of the employee. Rather than require the employee to physically secure a paper work order 301, the employee proceeds directly to logging on to the system 304, just as that employee does currently 303. Rather than to, again, separately log onto the DCAC/MRM 303, to print out the parts list 310, retrieve the hard copy from the printer 313, review the printed list 316, and determine the priority of tasking for the day 319, Mr. Smith (the machinist), will only review the list presented to him on log on 320. That list will have the priorities for the day displayed in real-time. This real-time capacity allows the reassignment of priority in the course of production.

The advantages over the system 10 continue as the user determines what cutter tools will be necessary. Rather than review a hard copy of the priority paper 323 to determine the priority of tasks assigned, the user needs only view the screen projecting the priorities on screen, with the associated cutter tools 324. There is no need to review and discern the cutter tools necessary 327; there is no need to separately order cutters from the tool crib 330; order tooling from the crib 333. Either way, Mr. Smith receives the necessary cutters.

Figure 12B:
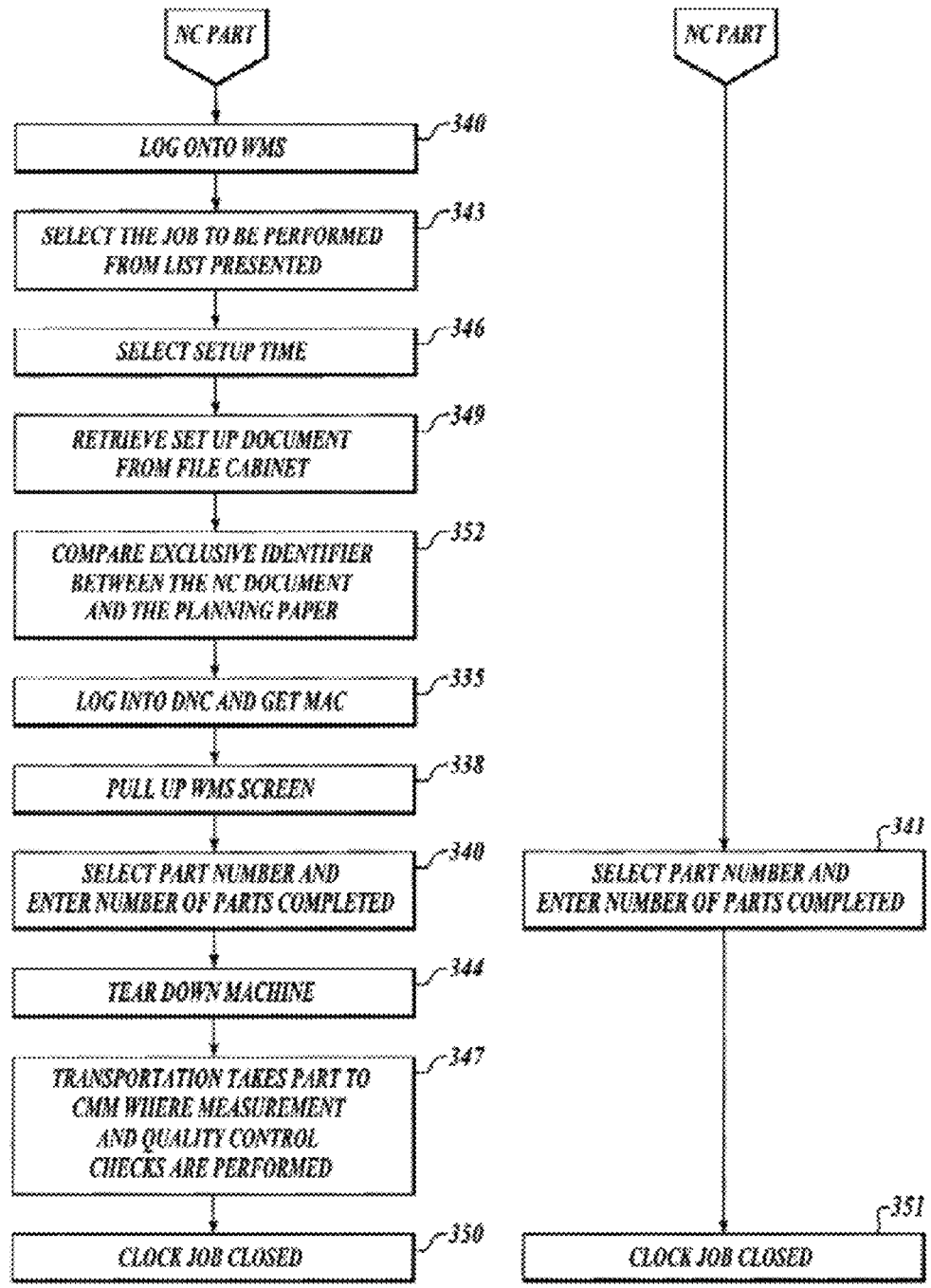

The process continues on FIG. 12B. The system 10 obviates the need to log-in onto the work center management system 340; to select the job 343; to select the set-up time 346; to retrieve the setup document 349; to check for correspondence between the part and the schematic 352. Additionally, the system 10 removes the need for a separate log-in to the distributed numeric control server 335, and to view the work center management screen 338. Rather, Mr. Smith proceeds immediately to what would be the next step 340, to select the part number and enter the necessary number of parts 341.

The system 10 also automates the tear down of a machine, thereby obviating the need for the tear down step 344. Similarly, the system 10 transports the completed part to the next step 347. Finally, Mr. Smith can clock the job closed 350 and 351.

The invention claimed is:

1. A machine shop comprising a computer system programmed to automatically determine an access role for a worker in response to a log-in; automatically determine at least one task to be performed by the worker based on the access role; and automatically interface with different legacy servers to order, subject to the access role, at least one of machine tooling for the machining of the part, product materials to be machined, and distributed numerical control (DNC) data for the machining of the part.

2. The machine shop of claim 1, wherein at least some of the legacy servers do not share information among each other.

3. The machine shop of claim 1, wherein automated machines and various legacy systems are configured to machine aircraft parts.

4. The machine shop of claim 1, wherein the computer system is further programmed to present a computer interface for allowing workers to log in.

5. The machine shop of claim 1, wherein the computer system is further programmed to automatically order assembly instructions for a machined part.

6. The machine shop of claim 1, wherein the computer system is further programmed to determine a status of the operation based on retrieved task information and completed tasks.

7. The machine shop of claim 1, wherein the computer system is programmed to automatically order the material to be machined.

8. The machine shop of claim 1, wherein the computer system is programmed to automatically order the machine tooling.

9. The machine shop of claim 1, wherein the computer system is programmed to determine a list of prioritized tasks according to the access role and display the list to the worker for selection of a task.

10. The machine shop of claim 9, wherein the list includes machine tooling for each task; and wherein the machine tooling corresponding to the selected task is automatically retrieved for the worker.

11. The machine shop of claim 1, wherein the computer system is programmed to automatically obtain quality control data for the worker, whereby the worker can make adjustments to a DNC machine prior to machining the part.

12. The machine shop of claim 11, wherein the computer system is programmed to run a browser to automatically download the DNC control data, and automatically use the DNC control data to control a DNC machine to machine the part.

13. The machine shop of claim 1, wherein the computer system is programmed to automatically select setup time, and check for correspondence between the ordered part and its schematic.

14. The machine shop of claim 1, wherein the interfacing also includes ordering quality control data for machining the part.

15. The machine shop of claim 1, wherein the interfacing also includes ordering assembly instructions for the part.

16. The machine shop of claim 1, wherein the machine tooling includes a cutting tool.

17. A factory comprising:
a plurality of legacy servers; and
a Gateway for automatically determining an access role for a worker in response to a log-in; automatically determining at least one task for the worker based on at least the access role; and automatically interfacing with the different legacy servers to order, subject to the access role, at least one of machine tooling for the machining of the part, product material to be machined, and distributed numerical control (DNC) control data for the machining of the part.

18. The factory of claim 17, further comprising a machine for using at least one of the ordered tooling, product material and control data for machining the part.

19. The factory of claim 17, wherein the machine tooling includes a cutting tool.

20. The factory of claim 17, wherein the factory is a commercial aircraft factory.

* * * * *